United States Patent
Tang et al.

(10) Patent No.: US 8,264,555 B2
(45) Date of Patent: Sep. 11, 2012

(54) REDUCING VIDEO SHAKING

(75) Inventors: Shih (Stanley) Min Tang, Tainan County (TW); Ho (Jet) Chao Huang, Shindian (TW); Bor (Brian) Ching Lin, Shindian (TW); Jau Hsing Huang, Shindian (TW)

(73) Assignee: Cyberlink Corp., Shindian, Taipei (TW)

( * ) Notice: Subject to any disclaimer, the term of this patent is extended or adjusted under 35 U.S.C. 154(b) by 129 days.

(21) Appl. No.: 12/844,012

(22) Filed: Jul. 27, 2010

(65) Prior Publication Data

US 2010/0289909 A1   Nov. 18, 2010

Related U.S. Application Data

(63) Continuation of application No. 11/954,777, filed on Dec. 12, 2007, now Pat. No. 7,800,652.

(51) Int. Cl.
*H04N 5/228* (2006.01)

(52) U.S. Cl. ............... 348/208.6; 348/208.1; 348/218.1

(58) Field of Classification Search ............. 348/208.1, 348/208.3, 208.4, 208.6, 208.13, 208.14, 348/218.1
See application file for complete search history.

(56) References Cited

U.S. PATENT DOCUMENTS

| | | | | |
|---|---|---|---|---|
| 6,122,004 A * | 9/2000 | Hwang | ............ | 348/208.13 |
| 6,628,711 B1 * | 9/2003 | Mathew et al. | ............ | 375/240.12 |
| 7,436,437 B2 * | 10/2008 | Fletcher et al. | ............ | 348/208.6 |
| 7,502,050 B2 | 3/2009 | Hatanaka et al. | | |
| 7,522,189 B2 * | 4/2009 | Chiba | ............ | 348/208.6 |
| 7,557,832 B2 * | 7/2009 | Lindenstruth et al. | ... | 348/208.99 |
| 7,558,405 B2 | 7/2009 | Tico et al. | | |
| 7,633,525 B2 | 12/2009 | Hatanaka | | |
| 7,697,034 B2 * | 4/2010 | Shimizu | ............ | 348/208.4 |
| 7,755,667 B2 * | 7/2010 | Rabbani et al. | ............ | 348/208.6 |
| 7,782,362 B2 * | 8/2010 | Oshima | ............ | 348/208.6 |
| 2005/0088531 A1 * | 4/2005 | Chiba | ............ | 348/208.1 |
| 2005/0179784 A1 | 8/2005 | Qi | | |
| 2006/0017814 A1 * | 1/2006 | Pinto et al. | ............ | 348/208.4 |
| 2006/0274156 A1 | 12/2006 | Rabbani et al. | | |
| 2007/0002146 A1 * | 1/2007 | Tico et al. | ............ | 348/208.1 |
| 2007/0076982 A1 | 4/2007 | Petrescu | | |
| 2009/0009613 A1 * | 1/2009 | Chien | ............ | 348/208.1 |
| 2009/0208128 A1 | 8/2009 | Hayashi et al. | | |
| 2009/0273683 A1 * | 11/2009 | Hoshino | ............ | 348/208.4 |
| 2010/0321503 A1 * | 12/2010 | Sakata | ............ | 348/169 |
| 2012/0069204 A1 * | 3/2012 | Shimizu et al. | ............ | 348/208.4 |

FOREIGN PATENT DOCUMENTS

WO    2007/074774 A1    7/2007

OTHER PUBLICATIONS

China Office Action dated Mar. 29, 2010.

* cited by examiner

*Primary Examiner* — John Villecco
(74) *Attorney, Agent, or Firm* — Thomas, Kayden, Horstemeyer & Risley, LLP (57) ABSTRACT

Included are embodiments for reducing undesirable motion in a video. At least one embodiment of a method includes receiving a plurality of video frames that comprise at least one segment of a video, the plurality of video frames being captured by a capture device and determining a maximum undesired movement of the capture device for the plurality of video frames during the at least one segment. Some embodiments include trimming at least a portion of the video frames according to the determined maximum undesired movement such that the undesirable movement in the video is reduced.

20 Claims, 9 Drawing Sheets

REDUCING VIDEO SHAKING

This application is a continuation application of U.S. application Ser. No. 11/954,777, which was filed on Dec. 12, 2007 and is incorporated herein by reference.

BACKGROUND

As video capture devices, such as video cameras, have become more accessible, many users now record numerous events. One problem with many recorded videos is that, when holding the recorder, a user may inadvertently shake and/or make other undesirable movements that can reduce the quality of the video. Additionally, utilization of many current solutions for this problem may result in excess power consumption, unnecessary expense, inadequate quality, and/or inadequate movement correction.

SUMMARY

Included are embodiments for reducing undesirable motion in a video. At least one embodiment of a method includes receiving a plurality of video frames that comprise at least one segment of a video, the plurality of video frames being captured by a capture device and determining a maximum undesired movement of the capture device for the plurality of video frames during the at least one segment. Some embodiments include trimming at least a portion of the video frames according to the determined maximum undesired movement such that the undesirable movement in the video is reduced.

Also included are embodiments of a system. At least one embodiment of a system includes a receiving component configured to receive a plurality of video frames that comprise at least one segment of a video, the plurality of video frames being captured by a capture device and a first determining component configured to determine a maximum undesired movement of the capture device for the plurality of video frames during the at least one segment. Some embodiments include a trimming component configured to trim at least a portion of the video frames according to the determined maximum undesired movement such that the undesirable movement in the video is reduced.

Also included are embodiments of a computer readable medium. At least one embodiment of a computer readable medium includes receiving logic configured to receive a plurality of video frames that comprise at least one segment of a video, the plurality of video frames being captured by a capture device and first determining logic configured to determine a maximum undesired movement of the capture device for the plurality of video frames during the at least one segment. Some embodiments include trimming logic configured to trim at least a portion of the video frames according to the determined maximum undesired movement such that the undesirable movement in the video is reduced.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included are embodiments for reducing and/or eliminating inadvertent movement by a capture device when capturing a video. More specifically, in at least one embodiment, a trimming frame may be created by determining a maximum amount of inadvertent movement during the video. By determining the maximum amount of inadvertent movement, the video can be trimmed according to the trimming frame such that a minimal amount of inadvertent movement is displayed.

Figure 1:
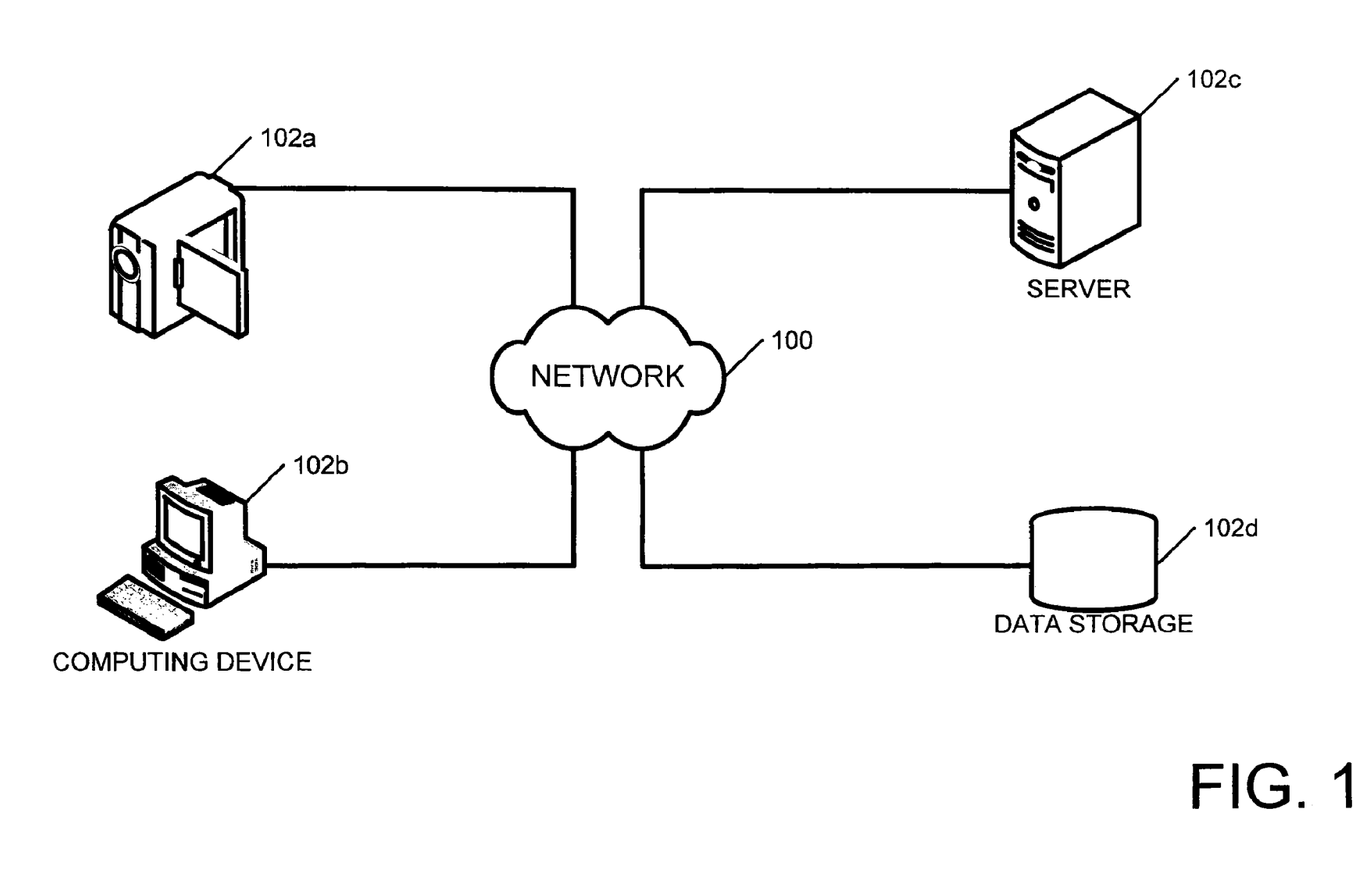
FIG. 1 is a nonlimiting example of a network that includes at least one computing device.

FIG. 1 is a nonlimiting example of a network that includes at least one computing device. As illustrated in the nonlimiting example of FIG. 1, a network 100 may be coupled to one or more devices for sending and/or receiving data. More specifically, the network 100 may include the Internet, a Public Switched Telephone Network (PSTN), a Mobile Telephone Network (MTN), and/or other Wide Area Network (WAN). Similarly, the network 100 may include a wired and/or wireless Local Area Network (wireless LAN or WLAN).

Coupled to the network 100 are a capture device 102a, a computing device 102b, a server 102c, and a data storage component 102d. The capture device 102a may include a video camera, a still camera, and/or an audio capture device.

Similarly, the capture device 102a may be configured with computing capabilities, communications capabilities, and/or other capabilities. Similarly, the computing device 102b may include a personal computer, laptop computer, PDA, etc. Depending on the particular configuration, the computing device 102b may also include communications capabilities, video capture capabilities, image capture capabilities, audio capture capabilities, and/or other capabilities, similar to the capture device 102a.

Also included are the server 102c and the data storage component 102d. The server 102c may be configured to provide data to and receive data from the capture device 102a and/or the computing device 102b. The server 102c may be configured as a web server, however this is not a requirement. Similarly, the data storage component 102d may be configured to receive and store data from the server 102c, the computing device 102b and/or the capture device 102a.

Figure 2:
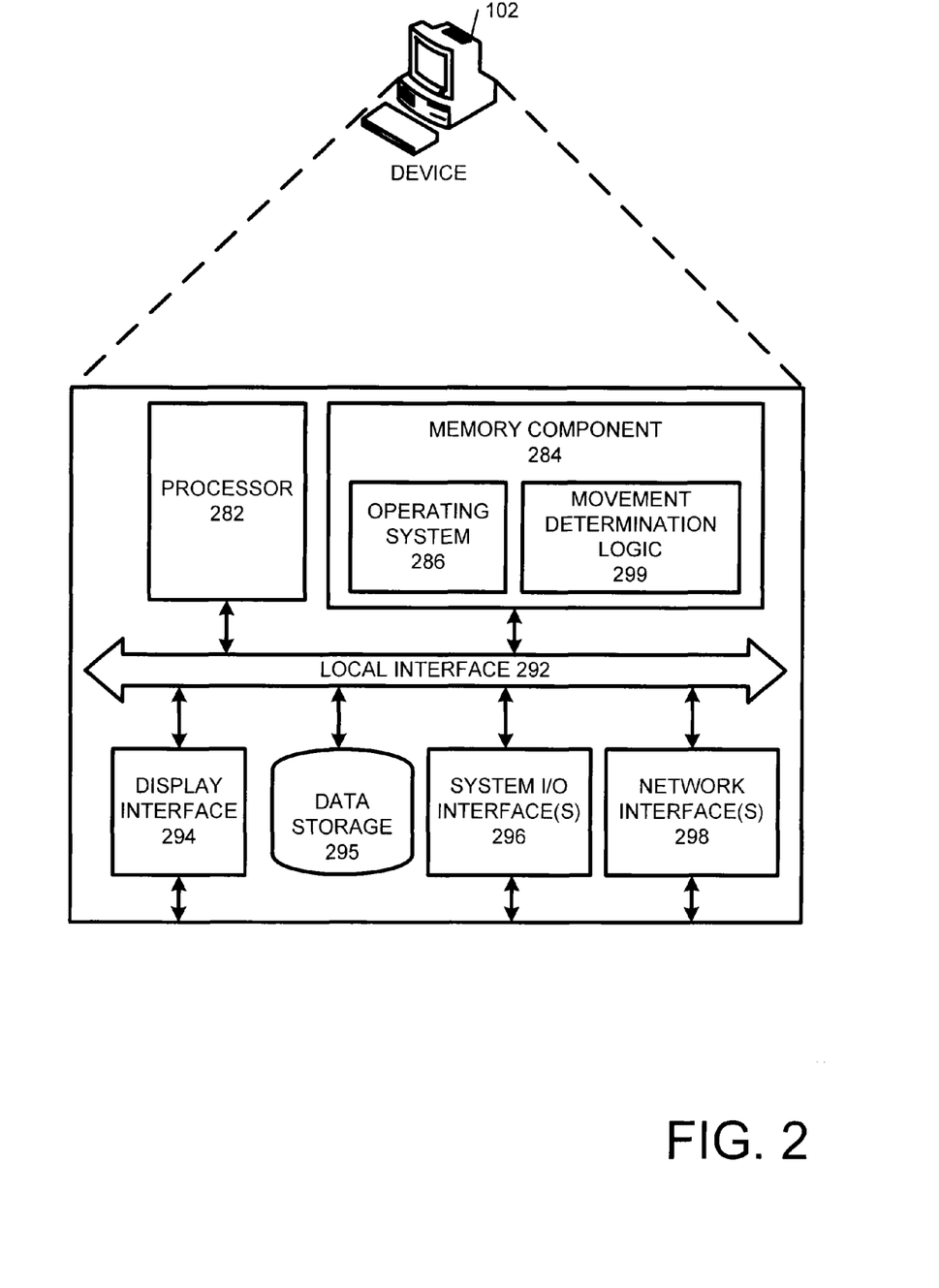
FIG. 2 is a nonlimiting example of a computing device, such as the computing device from FIG. 1.

FIG. 2 is a nonlimiting example of a computing device, such as the computing device from FIG. 1. Although a wireline device is illustrated, this discussion can be applied to wireless devices, as well. According to exemplary embodiments, in terms of hardware architecture, the device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include movement determination logic 299, as well as an operating system 286. The operating system 286 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The Input/Output devices that may be coupled to the system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the device 102 is activated.

When the device 102 is in operation, the processor 282 may be configured to execute software stored within the memory component 284, to communicate data to and from the memory component 284, and to generally control operations of the device 102 pursuant to the software. Software in the memory component 284, in whole or in part, may be read by the processor 282, perhaps buffered within the processor 282, and then executed.

One should note that while the description with respect to FIG. 2 includes the device 102 as a single component, this is a nonlimiting example. More specifically, in at least one embodiment, the device 102 can include a plurality of servers, personal computers, telephones, and/or other devices. Similarly, while the description of FIG. 2 describes the device 102, this is also a nonlimiting example, as other components may also be included in this description.

Additionally, while the movement determination logic 299 is illustrated in FIG. 2 as including a single software component, this is also a nonlimiting example. In at least one embodiment, the movement determination logic 299 may include one or more components, embodied in software, hardware, and/or firmware. Additionally, while the movement determination logic 299 is depicted as residing on a single device, such as device 102, the movement determination logic 299 may include one or more components residing on one or more different devices.

Figure 3A:
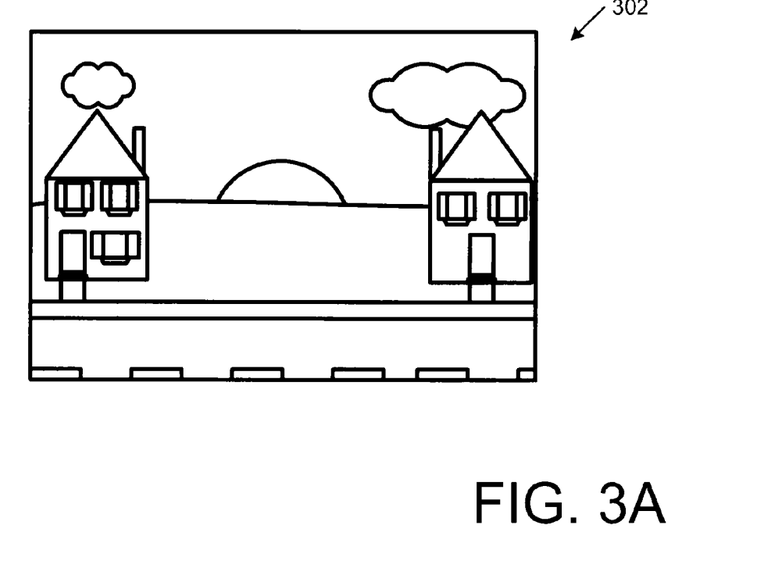
FIG. 3A is a nonlimiting of a video frame, which may be captured with the capture device from FIG. 1.

FIG. 3A is a nonlimiting of a video frame, which may be captured with the capture device from FIG. 1. As illustrated a nonlimiting example of FIG. 3A, a video frame 302 may be captured along with other video frames. In at least one embodiment, the video frame may be part of a video that includes one or more segments. Depending on the particular configuration, the video may be played back such as that the one or more video frames may be continuously displayed such that the video displays motion of the presented data.

As discussed above, the video may include one or more segments and may be configured with at least one marker (e.g., metatag) to differentiate between various aspects of the video. While in at least one configuration, the segments may be indistinguishable during playback, the movement determination logic 299 may be configured to utilize the segment designations to provide better quality of video.

Figure 3B:
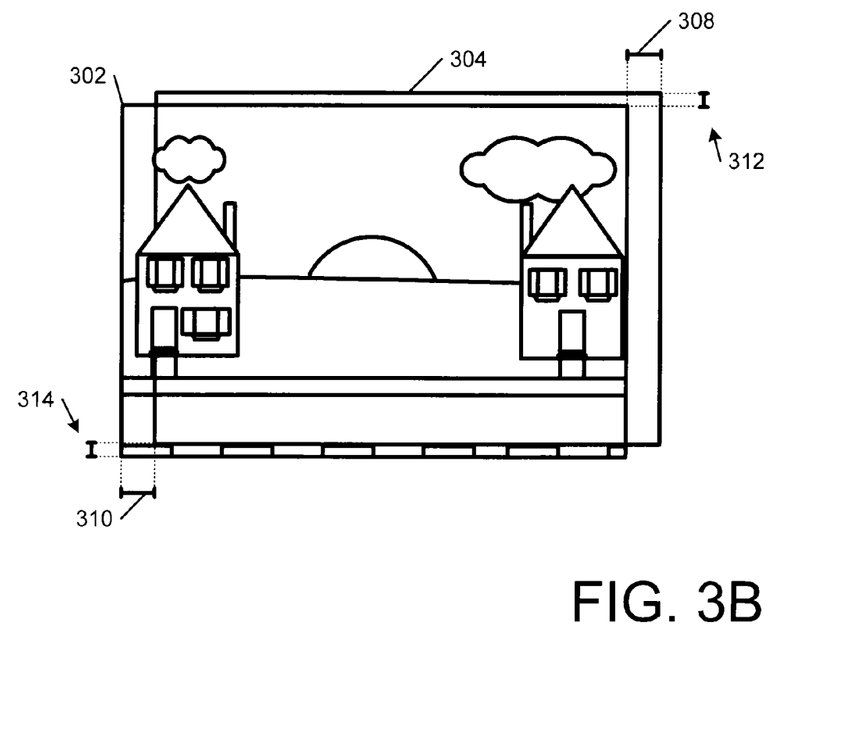
FIG. 3B is a nonlimiting example of a second video frame, similar to the video frame from FIG. 3A.

FIG. 3B is a nonlimiting example of a second video frame, similar to the video frame from FIG. 3A. As illustrated in the nonlimiting example in FIG. 3B, the video may include a second video frame 304, the second video frame 304 may be the next video frame in the video after the video frame 302 from FIG. 3A. As such, the video frame 304 may be very similar to the video display 302 with minor differences. One such difference, is illustrated in FIG. 3B, is that a user, when capturing the video frames 302, 304, may have shaken the capture device 102a such that during playback the video appears unsteady. As this inadvertent motion may reduce the quality of the video, embodiments disclosed herein may be configured to prevent and/or reduce this motion from the video.

As a nonlimiting example, in at least one exemplary embodiment, a determination can be made as to the magnitude of the unwanted motion. More specifically, the movement determination logic 299 (from FIG. 2) may determine at least one reference object in the video. The reference object may be an easily identified image in the video, such as an area of the video with high contrast. The reference object may be a stationary object in the real world, such as a building. In making this determination, the motion determination logic 299 may compare two or more video frames in the video.

Once at least one reference object is determined, the movement determination logic 299 may be configured to determine undesired movements of the capture device 102 with respect to the reference objects. As illustrated, the video frame 304 has moved both in the horizontal and vertical directions as illustrated with the overlay comparison of the video frame 302 with the video frame 304. More specifically, the video frame 304 has moved horizontally to the left as indicated as shown by indicator 308 and 310. Similarly, the video frame 304 has moved in a vertical direction with respect to video frame 302 as illustrated by indicators 312 and 314. One should also note that indicators 312 and 314 might be obtained by comparison of the video frame 302 with the video frame 304 from FIG. 3B. The vertical motion between video frame 302 and video frame 304 may not be related to indicators 312 and 314 unless comparing video frame 304 with video frame 302.

Additionally, while the movement determination logic 299 may be configured to determine horizontal and vertical changes between the video frame 302 and the video frame 304, other undesirable motions may also be determined. More specifically, the movement determination logic 299 may be configured to determine rotation of the capture device 102a in any of the plurality of different directions. As a nonlimiting example, the capture device 102a, during capture of the video, may be inadvertially rotated around any of plurality of different axes. Similarly, the movement determination logic 299 may be configured to determine inadvertent movement with respect to the distance of capture device 102a from the subject being captured.

Figure 3C:
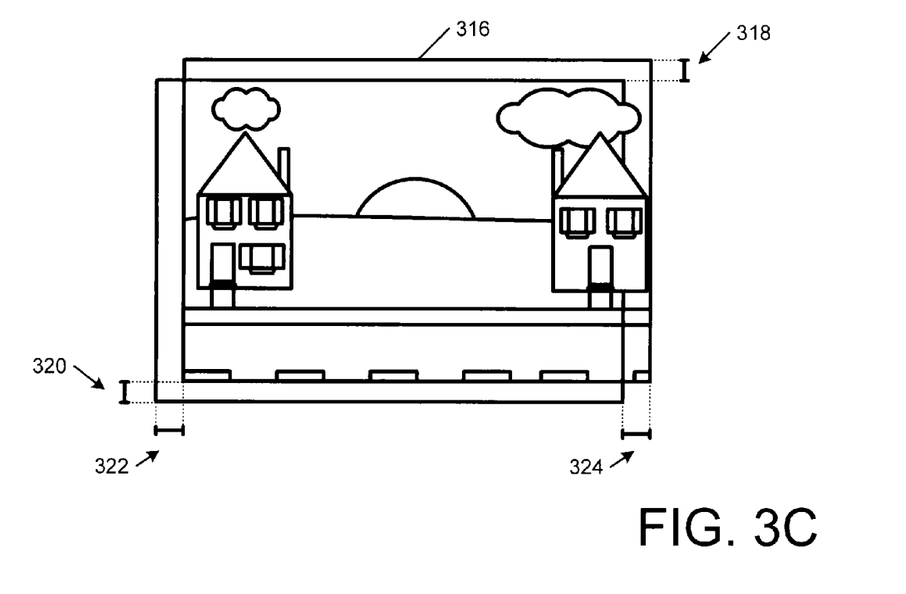
FIG. 3C is a nonlimiting example of a comparison of the video frames from FIGS. 3A and 3B.

FIG. 3C is a nonlimiting example of a comparison of the video frames from FIGS. 3A and 3B. As illustrated in the nonlimiting example of FIG. 3C, the video frame 316 may also be related to the video as discussed with regards to FIGS. 3A and 3B. More specifically, the video frame 302 from FIG. 3A may be determined as the reference frame by which to compare one or more other video frames (e.g., video frame 304). Upon comparing video frame 316 with the reference video frame (e.g., 302) a determination can be made with respect to the inadvertent movement of the capture device 102a in comparison to the determination made from FIG. 3B. As a nonlimiting example, if the vertical movement as illustrated by indicators 318 and 320 are greater than previously determined vertical movements (such as in FIG. 3B), the measurement of vertical movement can be documented. Similarly, if the horizontal movement is determined to be larger than previously determined historical horizontal movements, the measurement of this inadvertent movement may also be documented, as illustrated by indicators 322 and 324.

Figure 3D:
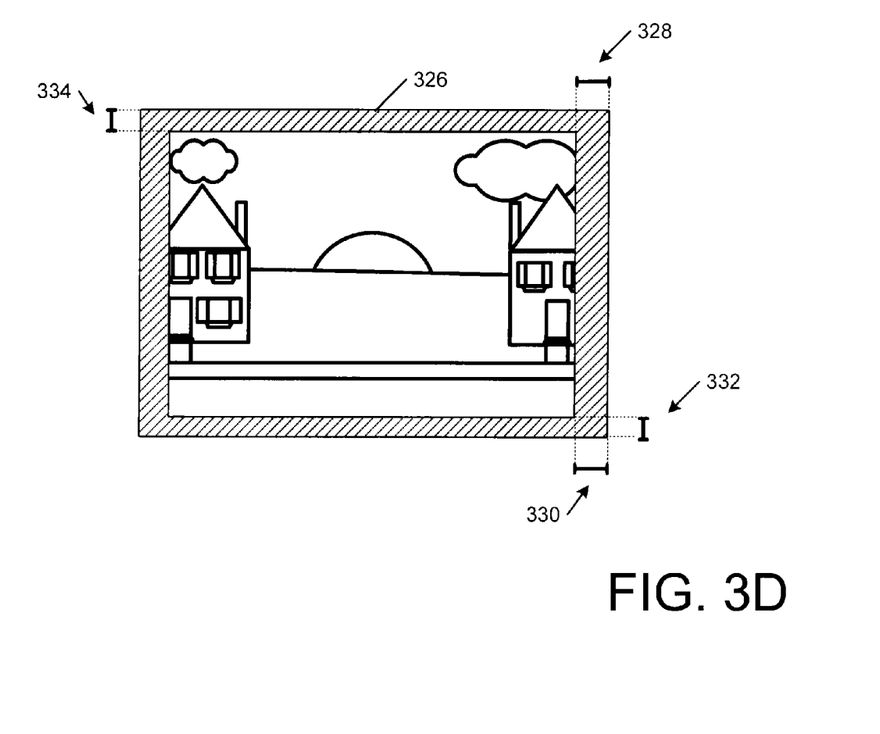
FIG. 3D is a nonlimiting example of a trimming frame, which may be created for a video, such as may be derived from the comparison from FIG. 3C.

FIG. 3D is a nonlimiting example of a trimming frame, which may be created for a video, such as may be derived from the comparison from FIG. 3C. As illustrated in the nonlimiting example of FIG. 3D, the video frame 326 may be a represented video frame from the video after processing by the movement determination logic 299. More specifically, after analyzing one or more video frames, as discussed with respect to FIGS. 3A-3C, this determination can be made as to the maximum inadvertent movement during a predetermined segment of the video. The maximum movement that is determined may be utilized to trim the video as illustrated with indicators 328, 330, 332, and 334. Indicators 328, 330, 332, and 334 may be similar to or the same as indicators 318, 320, 322, and 324. In at least one embodiment, the only difference is that in FIG. 3, the video area marked by indicators 328, 330, 332, and 334 is trimmed from the rest of the video. More specifically, after determining the maximum undesirable motion in the video segment, the movement determination logic 299 can remove the portions of the video frames in that segment such that the remaining video frames in the video segment do not include the undesirable movement. Shifting of one or more of the video frames may also be desired.

Stated another way, referring back to FIG. 3B, if the undesirable movement in the video segment is represented by indicators 308 in the horizontal direction and the greatest movement in the vertical direction is indicated by indicator 318, then that measurement of movement may be removed from one or more of the video frames in the segment. The one or more video frames may then be realigned such that no undesirable movement is present.

Figure 4A:
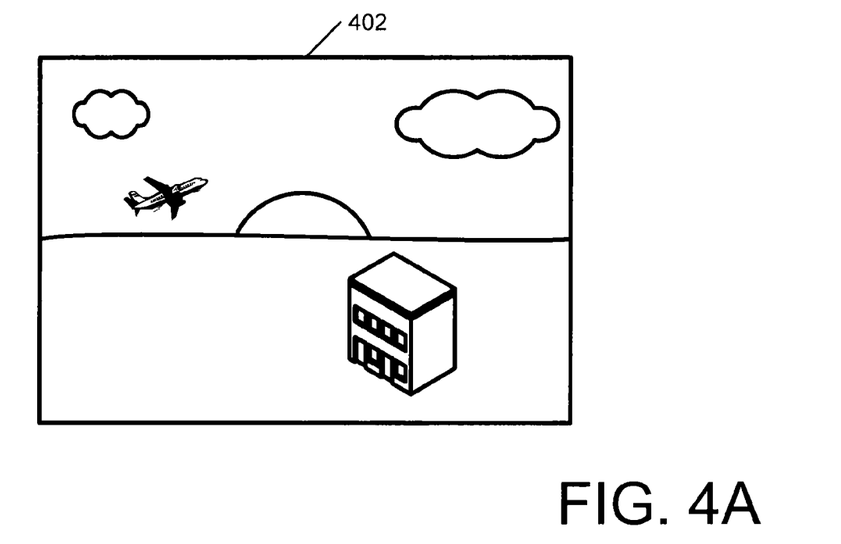
FIG. 4A is a nonlimiting example of a video frame for a video in which the capture device may be nonstationary, similar to the video frame in FIG. 3A.

FIG. 4A is a nonlimiting example of a video frame for a video in which the capture device may be nonstationary, similar to the video frame in FIG. 3A. As illustrated in a nonlimiting example in FIG. 4A, video frame 402 may be part of a second video and/or a second video segment from the videos from FIGS. 3A-3D. More specifically, nonlimiting example in FIG. 4A the capture device 102a may have desirable movement during capture of the images for the video.

Figure 4B:
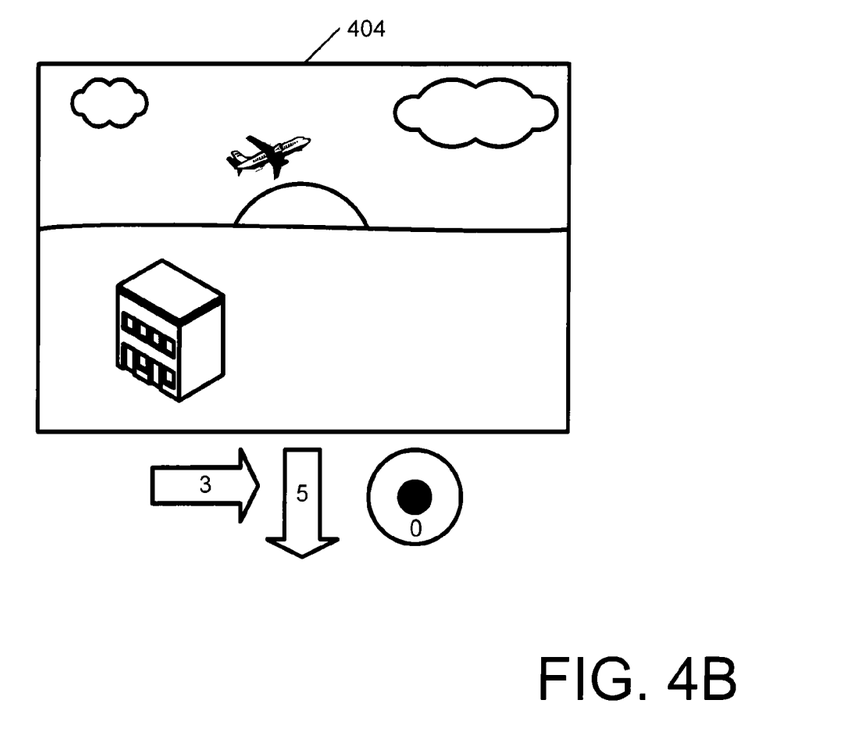
FIG. 4B is a nonlimiting example illustrating the movement of the capture device similar to the frame in FIG. 4A.

FIG. 4B is a nonlimiting example illustrating the movement of the capture device similar to the frame in FIG. 4A. As illustrated in a nonlimiting example in FIG. 4B, a video frame 404 may be included with the video and/or video segment as is the video frame 402. More specifically, the video frame 404 may be configured to illustrate the desirable motion of the capture device 102a during capture of the video. As a nonlimiting example the movement determination logic 299 may be configured to determine at least one reference object in the captured data to determine whether the video includes desired motion of the capture device 102*a*. Similarly, some embodiments may be configured with positioning logic (such as a global positioning system) to determine the desired movement of the capture device 102*a*. Regardless of the technique for determining the desired movement of the capture device 102*a*, the nonlimiting example of FIG. 4B illustrates that during the capture of video frame 402 and video frame 404 the capture device 102 moved in a horizontal direction three increments to the right and five increments in the downward direction. Additionally, the movement determination logic 299 also determined that the capture device 102*a* experienced no movement in the forward or backward direction.

One should note that while FIG. 4B does not explicitly indicate a desired rotation of the capture device 102*a*, this is a nonlimiting example. More specifically, in at least one exemplary embodiment, desirable rotation may be determined.

Figure 4C:
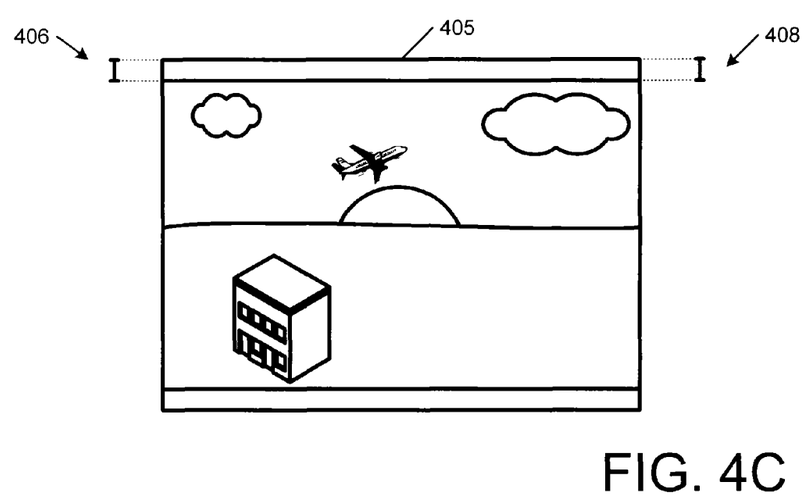
FIG. 4C is a nonlimiting example of a video frame, illustrating the comparison of the video frames from FIGS. 4A and 4C.

FIG. 4C is a nonlimiting example of a video frame, illustrating the comparison of the video frames from FIGS. 4A and 4C. As illustrated in a nonlimiting example in FIG. 4C, the capture device 102 also experienced some undesirable movement. More specifically, the capture device 102*a* experienced undesirable motion in the vertical direction as illustrated by indicators 406 and 408. On should note that while with some undesirable movements of the capture device 102*a* the measurement of the undesirable movement may be such that indicators 406 and 408 are equal, these are nonlimiting examples. More specifically, if there is rotation with the capture device 102*a*, indicators 406 and 408 may be unequal in values.

Figure 4D:
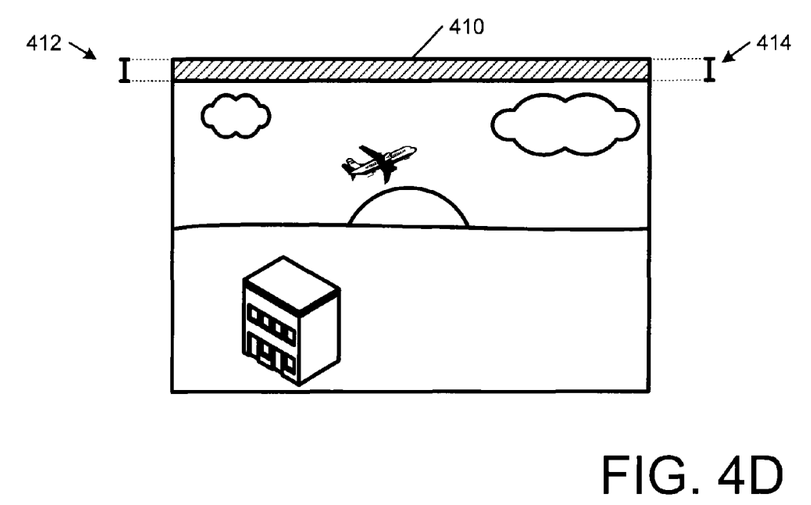
FIG. 4D is a nonlimiting example of a trimming frame that may be created from the video frames of FIGS. 4A-4C.

FIG. 4D is a nonlimiting example of a trimming frame that may be created from the video frames of FIGS. 4A-4C. As illustrated in nonlimiting example in FIG. 4D, video frame 410 may be displayed as a representative video frame from the video segment described with respect to FIGS. 4A-4D. More specifically, as discussed with regards to FIGS. 3A-3D, a determination of the maximum undesirable movement in the video segment may be determined such that the one or more video frames may be trimmed to reduce and/or eliminate the undesirable motion in the video during playback. As a nonlimiting example, indicators 412 and 414 illustrate the maximum vertical movement in the video segment. Thus, the one or more video frames 402, 404, and 405 may be trimmed to provide a stable video playback.

Figure 5:
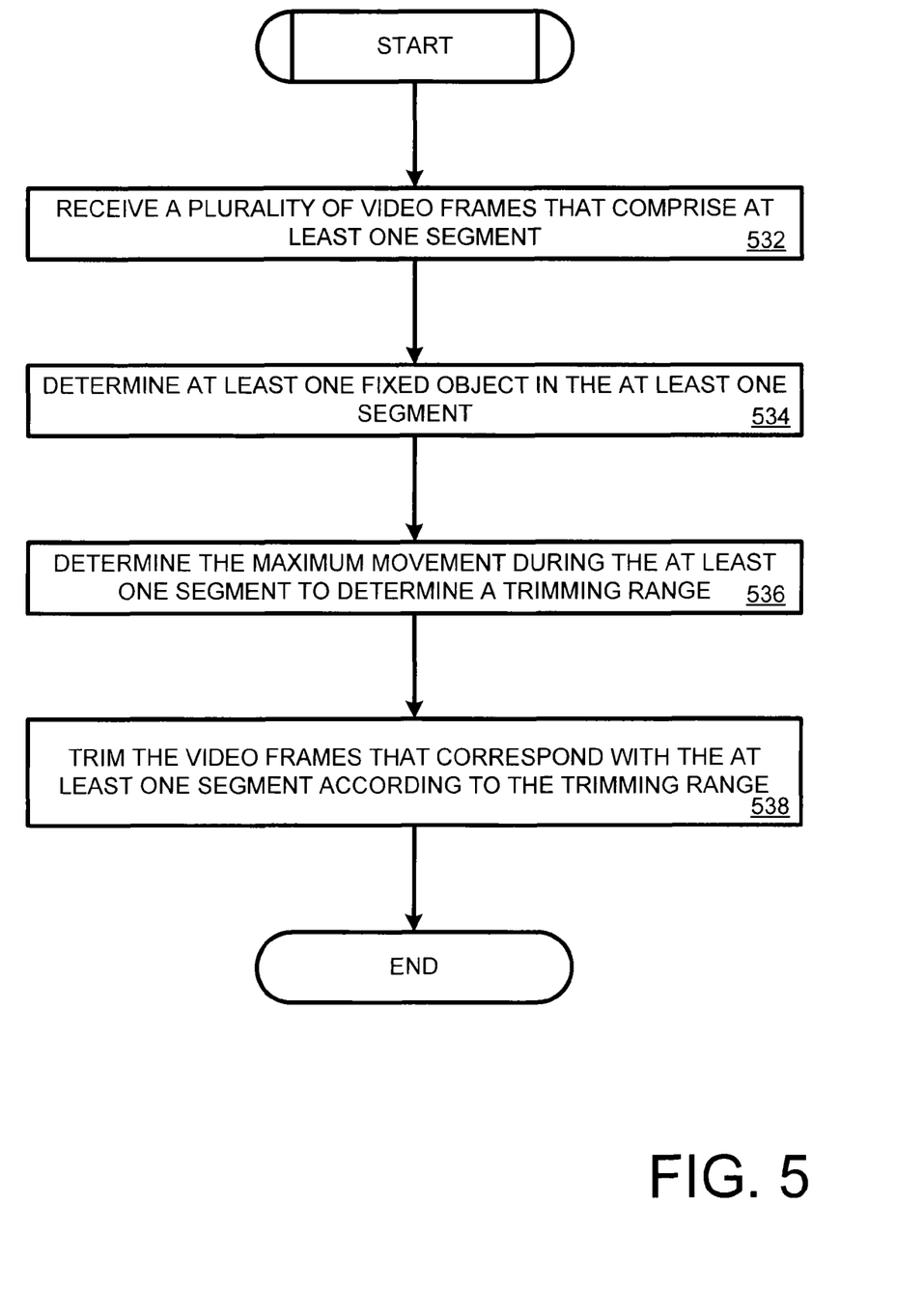
FIG. 5 is a flowchart illustrating a nonlimiting example of a process that may be utilized for reducing movement in a video, such as may be captured by the capturing device from FIG. 1.

FIG. 5 is a flowchart illustrating a nonlimiting example of a process that may be utilized for reducing movement in a video, such as may be captured by the capturing device from FIG. 1. As illustrated in a nonlimiting example for FIG. 5, the movement determination logic 299 can receive a plurality of video frames that comprise at least one segment (block 532). The movement determination logic 299 can determine at least one reference object in at least one segment (block 534). The movement determination logic 299 can determine the maximum movement during the at least one segment to determine a trimming range (block 536). The movement determination logic 299 can trim at least a portion of the video frames that correspond with at least one segment according to the determined trimming range (block 538).

Figure 6:
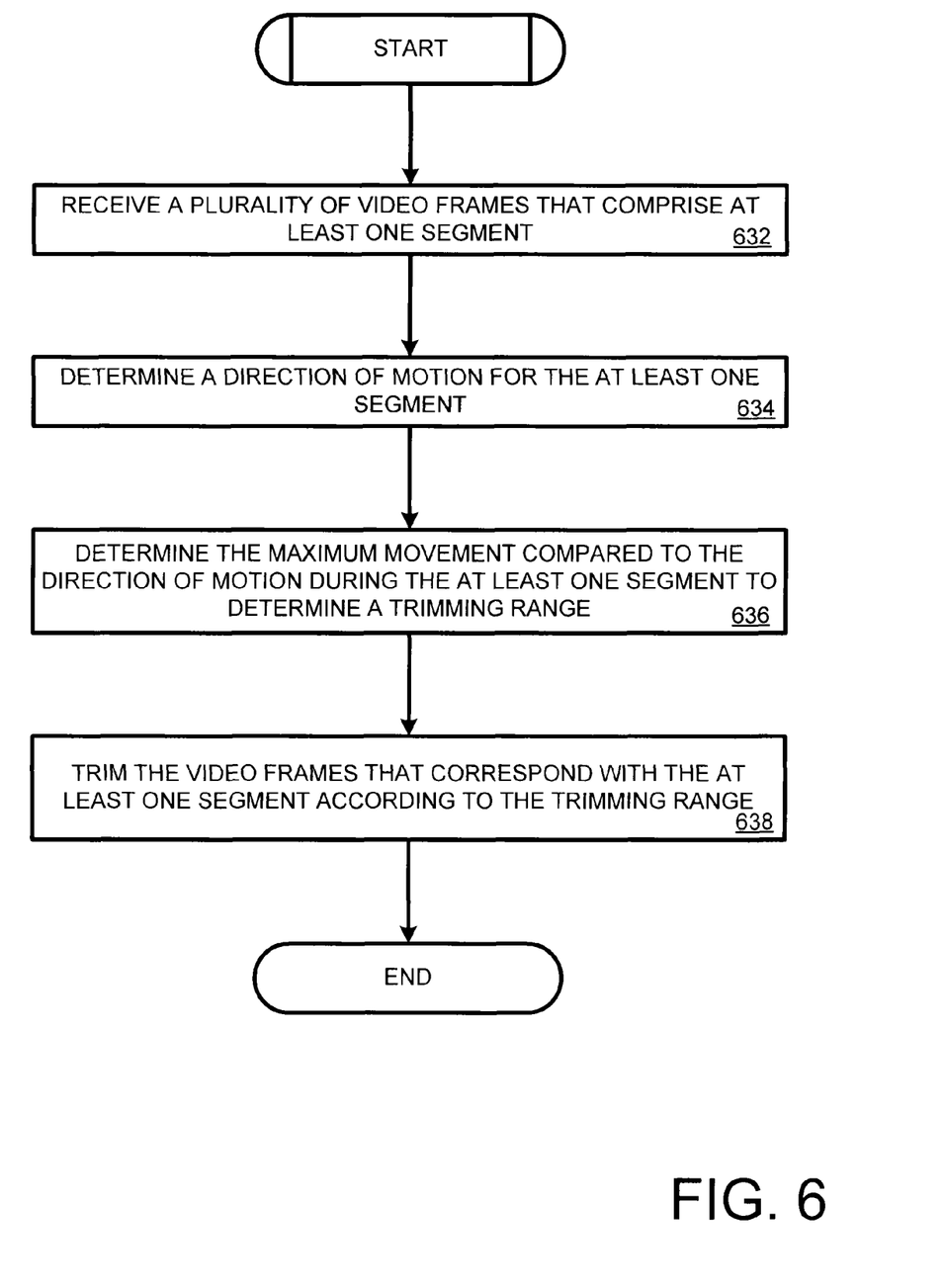
FIG. 6 is a flowchart illustrating a nonlimiting example of a process that may be utilized for reducing movement in a nonstationary video, similar to the flowchart from FIG. 5.

FIG. 6 is a flowchart illustrating a nonlimiting example of a process that may be utilized for reducing movement in a nonstationary video, similar to the flowchart from FIG. 5. As illustrated in the nonlimiting example of FIG. 6, the movement determination logic 299 can receive a plurality of video frames that comprise at of one segment (block 632). The movement determination logic 299 can determine a correction of motion for at least one segment (block 634). The movement determination logic 299 can determine the maximum undesired movement compared to the direction of motion during at least one segment to determine a trimming range (block 636). The movement determination logic 299 can trim the at least a portion of the video frames that correspond with at least one segment according to the trimming range (block 638).

Figure 7:
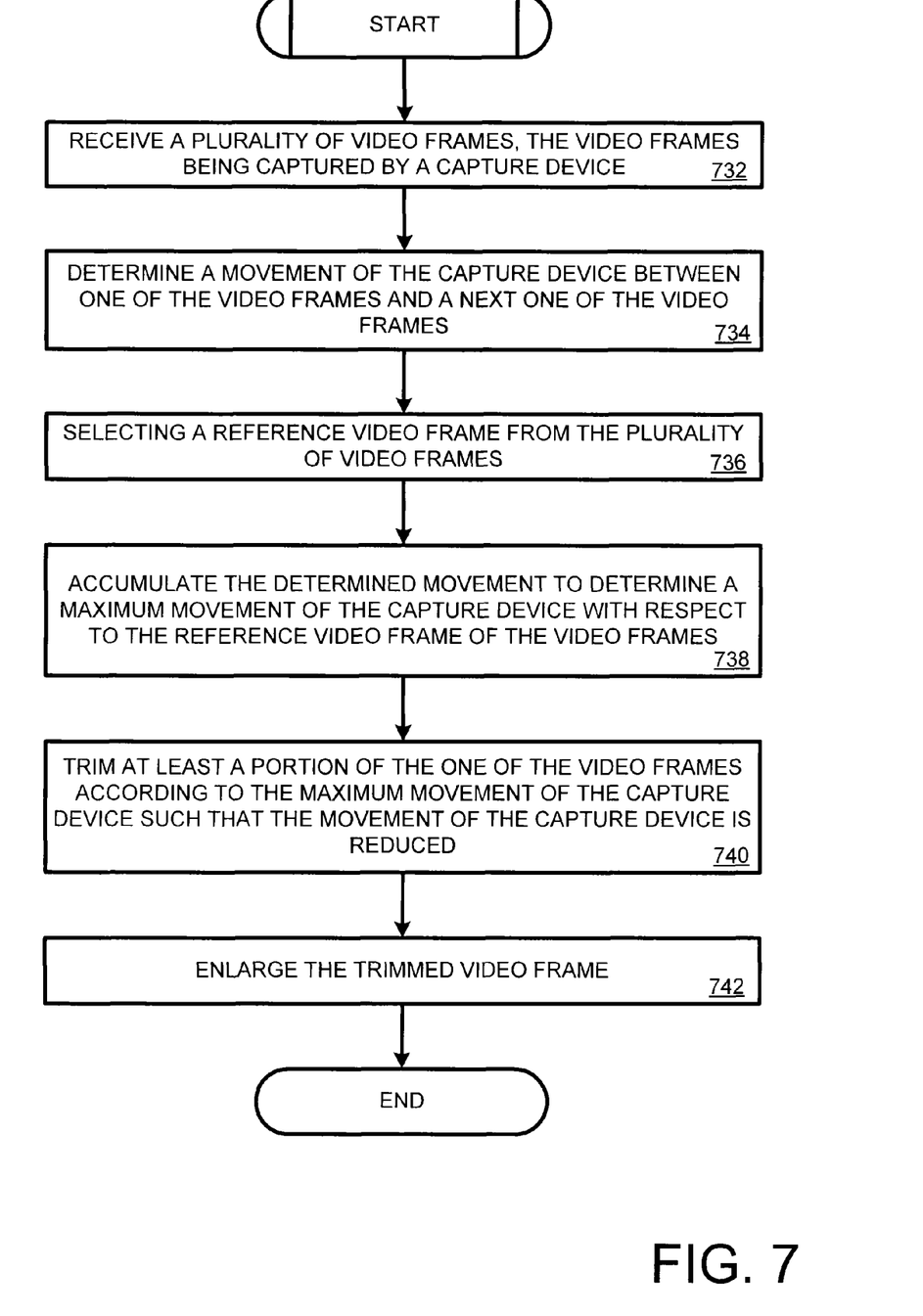
FIG. 7 is a flowchart illustrating a nonlimiting example of a process that may be utilized for reducing motion in a video, similar to the flowchart from FIG. 6.

FIG. 7 is a flowchart illustrating a nonlimiting example of a process that may be utilized for reducing motion in a video, similar to the flowchart from FIG. 6. As illustrated in the nonlimiting example of FIG. 7, a plurality of video frames can be received, where the video frames are captured by a capture device (block 732). Movement of the capture device can be determined during the time between one of the video frames and a next video frame (block 734). A reference video frame can be selected from the plurality of video frames (block 736). The reference frame can be the first video frame in the video, however this is not a requirement. The determined can be accumulated to determine a maximum movement of the capture device with respect to the reference video frame (block 738). At least a portion of the one of the video frames can be trimmed according to the maximum movement of the capture device such that the movement of the capture device is reduced (block 740). The enlarged video frame can be enlarged (block 742). Also, in at least one embodiment, an object in the video can be determined and the movement of the capture device can be determined by analyzing the object. Additionally, one or more of these portions of the process can be repeated, for dynamically adjusting the trimming range and maintaining quality of the video. Further the reference frame may be re-selected to facilitate the dynamic adjustment.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for reducing undesired motion in a video, comprising:
   receiving a plurality of video frames that comprise at least one segment of a video, the plurality of video frames being captured by a capture device;
   determining undesired movement of the capture device for each of the plurality of video frames during the at least one segment; and
   trimming at least a portion of the video frames according to a determined maximum undesired movement from among the plurality of video frames such that the undesired movement in the video is reduced.

2. The method of claim 1, further comprising determining a magnitude of undesired movement for at least one of the plurality of video frames.

3. The method of claim 2, wherein determining a magnitude of undesired movement includes determining a vertical motion, a lateral motion, a forward motion, a backward motion, or a rotation.

4. The method of claim 1, further comprising determining at least one reference object in the at least one segment.

5. The method of claim 4, further comprising utilizing the at least one reference object to determine undesired movement for at least one of the video frames.

6. The method of claim 1, further comprising determining whether the video includes desired motion of the capture device.

7. The method of claim 1, wherein the capture device includes a video camera, a still image camera, a computing device, or a communications device.

8. A system for reducing undesired motion in a video, comprising:
   at least one computing device; and
   a receiving component executable in the at least one computing device, the receiving component configured to receive a plurality of video frames that comprise at least one segment of a video, the plurality of video frames being captured by a capture device;
   a first determining component executable in the at least one computing device, the first determining component configured to determine a maximum undesired movement of the capture device for each of the plurality of video frames during the at least one segment; and
   a trimming component executable in the at least one computing device, the trimming component configured to trim at least a portion of the video frames according to the determined maximum undesired movement from among the plurality of video frames such that the undesired movement in the video is reduced.

9. The system of claim 8, further comprising a second determining component executable in the at least one computing device, the second determining component configured to determine a magnitude of undesired movement for at least one of the plurality of video frames.

10. The system of claim 9, wherein determining a magnitude of undesired movement includes determining at least a vertical motion, a lateral motion, a forward motion, a backward motion, or a rotation.

11. The system of claim 8, further comprising a third determining component executable in the at least one computing device, the third determining component configured to determine at least one reference object in the at least one segment.

12. The system of claim 11, further comprising a utilizing component executable in the at least one computing device, the third determining component configured to utilize the at least one reference object to determine undesired movement for at least one of the video frames.

13. The system of claim 8, further comprising a fourth determining component executable in the at least one computing device, the fourth determining component configured to determine whether the video includes desired motion of the capture device.

14. The system of claim 8, wherein the capture device includes a video camera, a still image camera, a computing device, or a communications device.

15. A computer readable medium for reducing undesired motion in a video, comprising:
   receiving logic configured to receive a plurality of video frames that comprise at least one segment of a video, the plurality of video frames being captured by a capture device;
   first determining logic configured to determine a maximum undesired movement of the capture device for each of the plurality of video frames during the at least one segment; and
   trimming logic configured to trim at least a portion of the video frames according to the determined maximum undesired movement from among the plurality of video frames such that the undesired movement in the video is reduced.

16. The computer readable medium of claim 15, further comprising second determining logic configured to determine a magnitude of undesired movement for at least one of the plurality of video frames.

17. The computer readable medium of claim 16, wherein determining a magnitude of undesired movement includes determining a vertical motion, a lateral motion, a forward motion, a backward motion, or a rotation.

18. The computer readable medium of claim 15, further comprising third determining logic configured to determine at least one reference object in the at least one segment.

19. The computer readable medium of claim 18, further comprising utilizing logic configured to utilize the at least one reference object to determine undesired movement for at least one of the video frames.

20. The computer readable medium of claim 15, further comprising fourth determining logic configured to determine whether the video includes desired motion of the capture device.

* * * * *